United States Patent [19]

Gregg et al.

[11] Patent Number: 4,618,309
[45] Date of Patent: Oct. 21, 1986

[54] MECHANICAL HANDLING MECHANISM, IN PARTICULAR FOR THE LOADING AND UNLOADING OF MACHINE TOOLS

[75] Inventors: Hans Gregg, Woerthsee; Theodor Artmeier, Puchheim, both of Fed. Rep. of Germany

[73] Assignee: Carl Hurth Maschinen und Zahnradfabrik GmbH & Co., Munich, Fed. Rep. of Germany

[21] Appl. No.: 690,797

[22] Filed: Jan. 11, 1985

[30] Foreign Application Priority Data

Feb. 9, 1984 [DE] Fed. Rep. of Germany ....... 3404553

[51] Int. Cl.⁴ ............................................. B65G 11/00
[52] U.S. Cl. .................................. 414/753; 414/751; 414/917
[58] Field of Search ............... 414/730, 749, 750, 751, 414/752, 917; 901/14; 74/39, 45, 48, 52, 99, 102, 103, 105

[56] References Cited

U.S. PATENT DOCUMENTS

| 4,218,173 | 8/1980 | Coindet et al. | 414/730 |
| 4,295,780 | 10/1981 | Wada et al. | 414/749 |
| 4,329,110 | 5/1982 | Schmid | 414/917 X |
| 4,530,636 | 6/1985 | Mason et al. | 414/750 |

Primary Examiner—Robert J. Spar
Assistant Examiner—Dennis Williamson
Attorney, Agent, or Firm—Flynn, Thiel, Boutell & Tanis

[57] ABSTRACT

A mechanical handling mechanism with a small space requirement consists of oppositely rotatable swivel arms, at the one ends thereof are pivotally connected hinge arms, at the other ends of which are pivotally connected a joint head. The joint head carries a gripping mechanism, the position stiffness of which is assured by a sliding joint parallelogram between the swivel arms and the joint head. The swivel arms are functionally connected together, however, they can also be driven individually. In the latter construction, various desired targets can be reached by the gripping mechanism.

10 Claims, 8 Drawing Figures

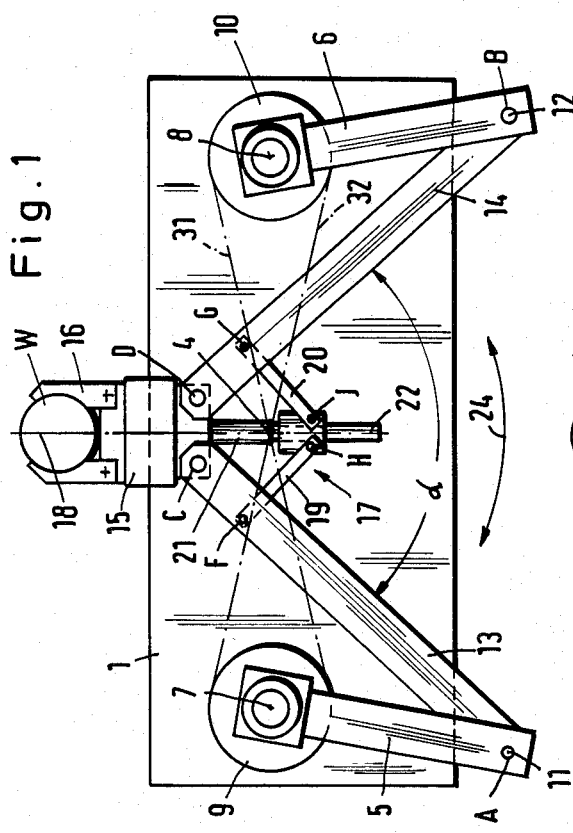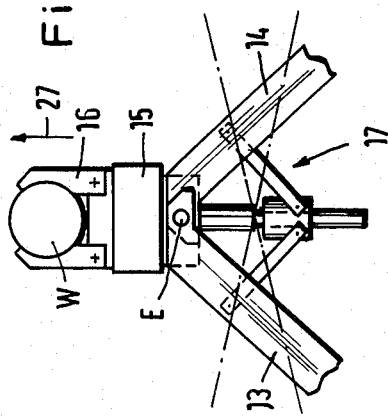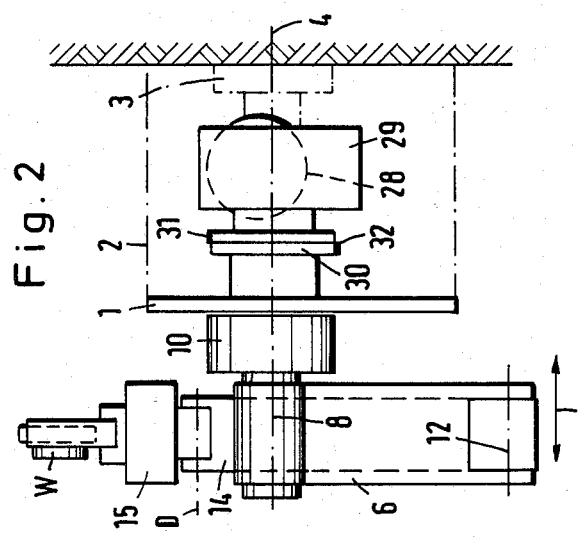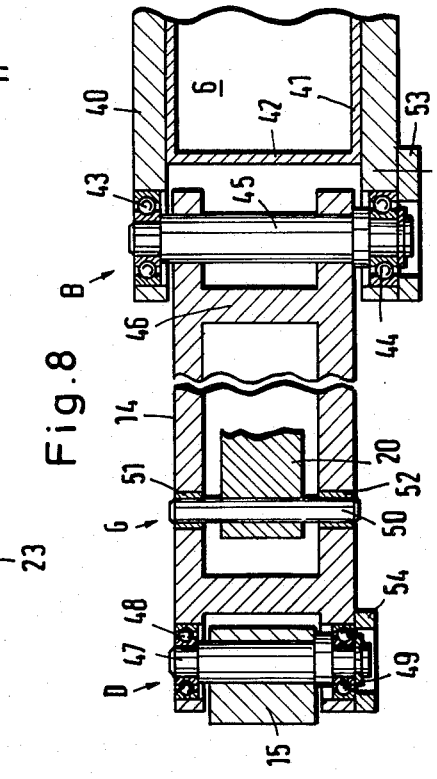

MECHANICAL HANDLING MECHANISM, IN PARTICULAR FOR THE LOADING AND UNLOADING OF MACHINE TOOLS

FIELD OF THE INVENTION

The invention relates to a mechanical handling mechanism having at least one gripping mechanism or the like, which can be moved back and forth between an initial position, for example a workpiece storage or conveyor, and an end position, for example the work space of a machine tool.

BACKGROUND OF THE INVENTION

Such linear movements in mechanical handling systems are as a rule created through the use of the circular or flat guides. The disadvantages of these systems are substantially the following:

(a) The necessary stiffness in the extended condition often does not exist. This is true in particular for systems in which the gripping mechanism is arranged at the free end of a piston rod (German GM No. 79 10 366).

(b) In the retracted condition, considerable space is required for the component parts which approximately equals the space considered as the range toward the desired target (German GM No. 80 16 572).

(c) A speed reduction prior to reaching the end positions requires additional and expensive control technology.

(d) The moving toward desired targets, which lie outside of a straight line or even in the free space therearound, is often not possible (German OS No. 31 34 784) or requires additional axes (directions of movement) (German OS No. 29 30 006).

(e) A freely changeable characteristic or the ability to adjust to changed manufacturing sequences is almost impossible, in particular when the hand system is substantially integrated into the machine (German OS No. 29 30 006).

Starting out from these findings, the basic purpose of the invention is to provide a handling mechanism which conserves space to as little space as possible separately from the machine tool, which in spite of small dimensions has the necessary stiffness and which without any additional expense reduces the speed of movement of the gripping mechanism prior to reaching the end positions. In addition, it is possible to move to desired targets which lie outside of a straight line.

This purpose is attained by providing a mechanical hand mechanism which can be utilized in situations where the reach is initially adjusted to the respective case and occupies in the initial position only a comparatively small space. The coupling of the hinged arms to the common joint head results in a high degree of stiffness in the extended condition, so that heavy workpieces can also be handled. The end positions are controlled with a high degree of exactness with the aforesaid speed reduction which can be achieved through the inventive arrangement of the joints and arms, which especially is needed during the feeding of machine tools. Single and multiple gripping systems can be arranged on the joint head, and their position stiffness is achieved with a sliding joint parallelogram. The necessary drive power is small, since only the rolling friction in the joints is to be overcome. A further advantage which must be mentioned is the simple construction which is inexpensive to manufacture.

It is a further purpose of the invention to move the gripping mechanism in a rectilinear direction of movement or to one or several desired targets outside of a straight line. An individual desired target next to a straight line can also be reached when the swivel arms and/or the hinged arms are of different lengths.

The field of use of the handling mechanism can be broadened substantially to, for example, remove blanks from a storage area and feed them to the machine and taking the finished parts and removing them from the machine and delivering them to a storage place on, for example, a pallet or a conveying mechanism or the like.

It is also a purpose of the invention to further increase the stiffness of the structure. The double support of the joints and avoiding of so-called cantilevered supports reduces the otherwise existing elasticity in the joints.

BRIEF DESCRIPTION OF THE DRAWINGS

The invention will be described hereinafter with reference to one exemplary embodiment, which is illustrated in FIGS. 1 to 8, in which:

FIG. 1 is a top view of the mechanical hand mechanism in the initial position;

FIG. 2 is a side view;

FIG. 5 is a modification of the joint head;

FIG. 8 is an enlarged illustration of the joints.

DETAILED DESCRIPTION

Figure 3:
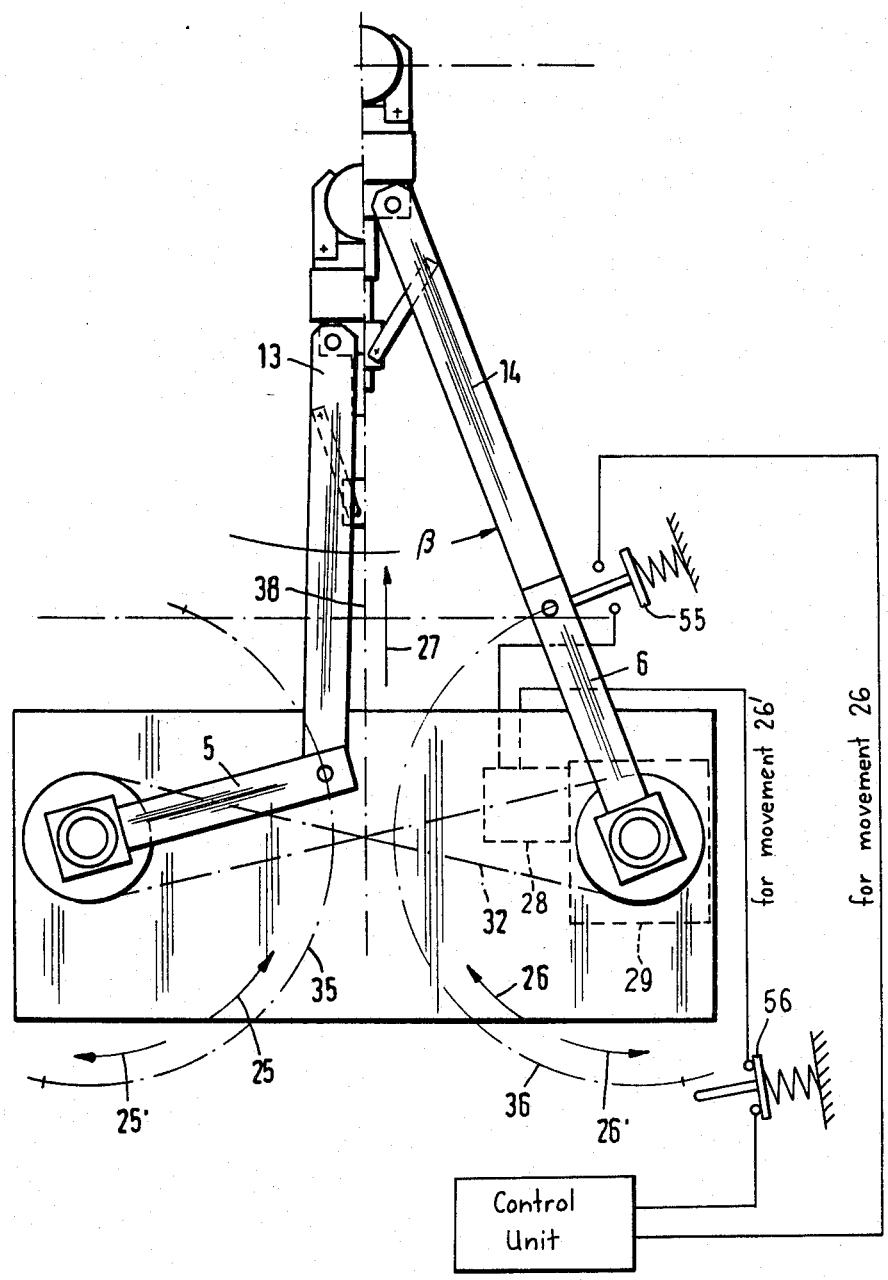
FIG. 3 is a top view in an intermediate position and in the end position.
Figure 4:
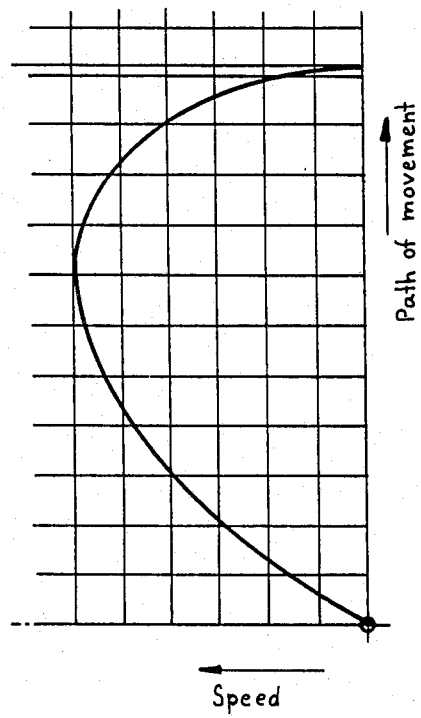
FIG. 4 illustrates a path of movement-speed diagram.

Two swivel arms 5 and 6 are pivotally supported about vertical axes 7 and 8 in bearing housings 9 and 10 on a base plate 1 (FIGS. 1 and 2) secured to a frame 2 whic is only schematically indicated. The swivel arms 5 and 6 can be axially adjustable (arrow direction 23) or they can be pivotal about an axis 4 (arrow direction 24) with a conventional hydraulic or mechanical device 3. The drive for the swivel or pivoting movements will be discussed hereinbelow.

The free ends of the swivel arms 5 and 6 have arms 13 and 14 hingedly secured in joints A and B and the axes 11 and 12 of which are directed parallel with respect to the axes 7 and 8. The hinged arms 13 and 14 are mounted at their opposite ends in joints C and D on a joint head 15. In place of the joints C and D it is also possible to provide a single joint E (FIG. 5) which is common for both hinged arms 13 and 14. A gripping mechanism 16 is mounted on the joint head 15 and is adapted to receive therein a workpiece W, for example a gear which is to be machined or finish machined. The gripping mechanism and its operation is known and do not need to be described in detail here. In place of the illustrated gripping mechanism 16, it is also possible to provide any other gripping mechanism, for example a double gripping means, or a slide member or the like, and the gripping mechanism can be rotatable about its central axis 18.

For stabilizing the gripping mechanism or its position a sliding joint parallelgram 17 is provided and consists of two steering knuckle arms 19 and 20, a slide member 21 and a rod-shaped guide 22 which is mounted on the joint head 15. The steering knuckle arms 19 and 20 are hinged in joints F and G to the hinged arms 13 and 14 and in joints H and J on the slide member 21. The axes of these joints just like the axes of the joints C, D and E extend also parallel to the axes 7 and 8.

In order to move the gripping mechanism 16 in direction of the arrow 27 (FIG. 3) from the initial position illustrated in FIGS. 1 to 5 into the end position illustrated on the right in FIG. 3, the swivel arms 5 and 6 carry out oppositely directed pivotal movements 25 and 26. For this purpose the axis 8 is connected to a drive member 28 and a reduction gear device 29. The servomotor can be an electrical or hydraulic servomotor, the output of the reduction gearing being connected to the axis 8. Two chains 31 and 32 of finite length are secured in various planes to a disk 30 which is rotatable with the swivel arm 6 and is guided radially from the disk 30 to a similar disk on the swivel arm 5 whereat it is also secured. If now the swivel arm 6 is rotated in the direction of the arrow 26, then the swivel arm 5 is also rotated through the working of the disk 30, the chain 31 and the not illustrated other disk in the direction of the arrow 25. These rotative movements cause the hinged arms 13 and 14 to move the joint head 15 and associated gripping mechanism 16 from the initial position forwardly in the direction of the arrow 27, so that the hinged arms 13 and 14, which at first define an angle $\alpha$ (FIG. 1) are moved to reduce the angle $\alpha$ until the arms extend at least approximately parallel in an intermediate position (on the left side of FIG. 3). Continued movement of the arms will cause the angle to enlarge until the terminal positions thereof are reached whereat the angle $\beta$ is defined therebetween (see right side of FIG. 3). The sliding joint parallelogram thereby performs the task of holding the joint head 15 and thus the gripping mechanism 16 is always in a position which is symmetrical with respect to the hinged arms, thus a defined position (the line of symmetry of the joint head 15 or the guide 22 lies always on the bisector of the angle $\alpha$ or $\beta$). When the end position is reached, limit switch 55 is operated, for example by the swivel arm 6, and the drive member 28 is turned off.

The speed with which the gripping mechanism 16 is moved forwardly (FIG. 4), increase with increasing movement over the initial path of movement of the gripping mechanism, reaches a maximum when the swivel arms 5 and 6 form right angles with the hinged arms 13 and 14, and is reduced steadily until it has the value zero in the end position, namely, when the swivel arms are in alignment with the hinged arms. The result is that the feed takes place very quickly, then, however, is automatically slowed down. This is of particular importance especially in the feeding of machine tools where the end position as a rule corresponds with the position of "workpiece reception" and thus must be controlled with a high degree of exactness. During a pulling back of the gripping mechanism, the swivel arm 6 is rotated in the opposite direction 26', and the swivel arm 5 is now rotated caused by the disk 30, the chain 32 and the other disk in the direction of the arrow 25'. The retracting speed increases during the initial phase of movement starting out from zero first to a maximum and then slowing again during the final course of movement. Also upon reaching the end position a limit switch 56 is operated and the drive member is turned off.

Figure 6:
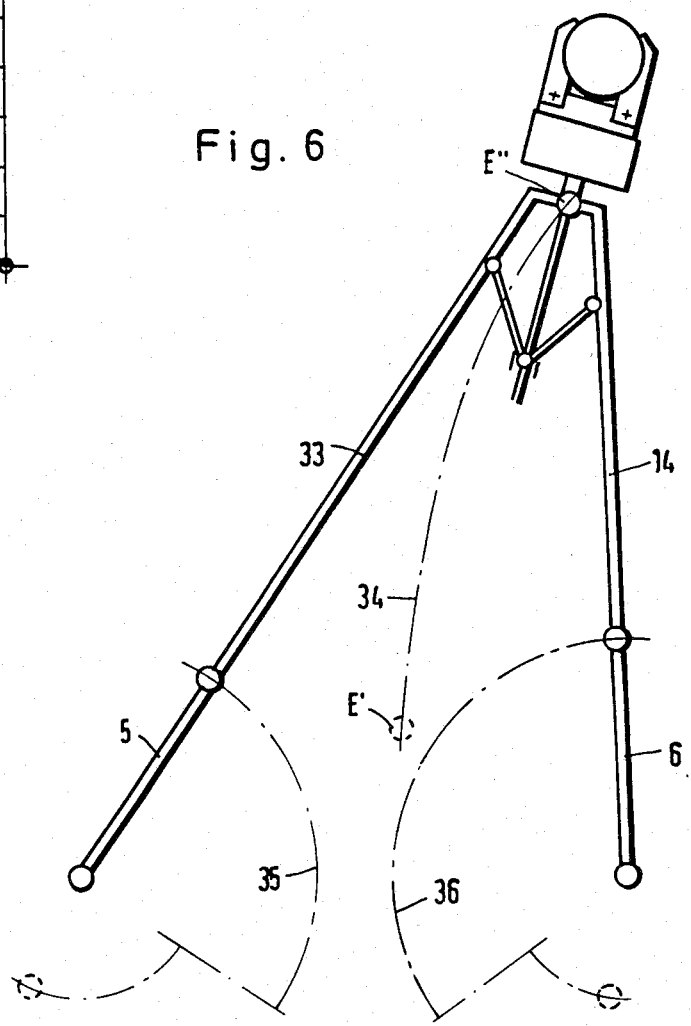
FIGS. 6 and 7 illustrate two views in the end position similar to FIG. 3, however, with an end point on a curved sector with the pivot drive not being coupled (FIG. 6) and with different arm lengths (FIG. 7)

In the above-described mechanism illustrated in FIGS. 1 to 3, the movement of the gripping mechanism 16 occurs along a straight line 38 (FIG. 3). A prerequisite for this is that the two swivel arms 5 and 6 are both equally rotated in opposite directions and that both swivel arms 5 and 6 and also the hinged arms 13 and 14 are of the same length. However, in some cases it is necessary to move to an end position which does not lie on the straight line 38. In such cases, it is possible to construct the hinged arms 13 and 14 and/or the swivel arms 5 and 6 of different lengths. In the example which is illustrated in FIG. 6, a hinged arm which is indentified by the reference numeral 33 is longer than the hinged arm 14 with the result that the feed movement of the gripping mechanism occurs on a curved sector 34. (The position of the joint E is thereby identified in the initial position by E' and in the end position by E".)

Figure 7:
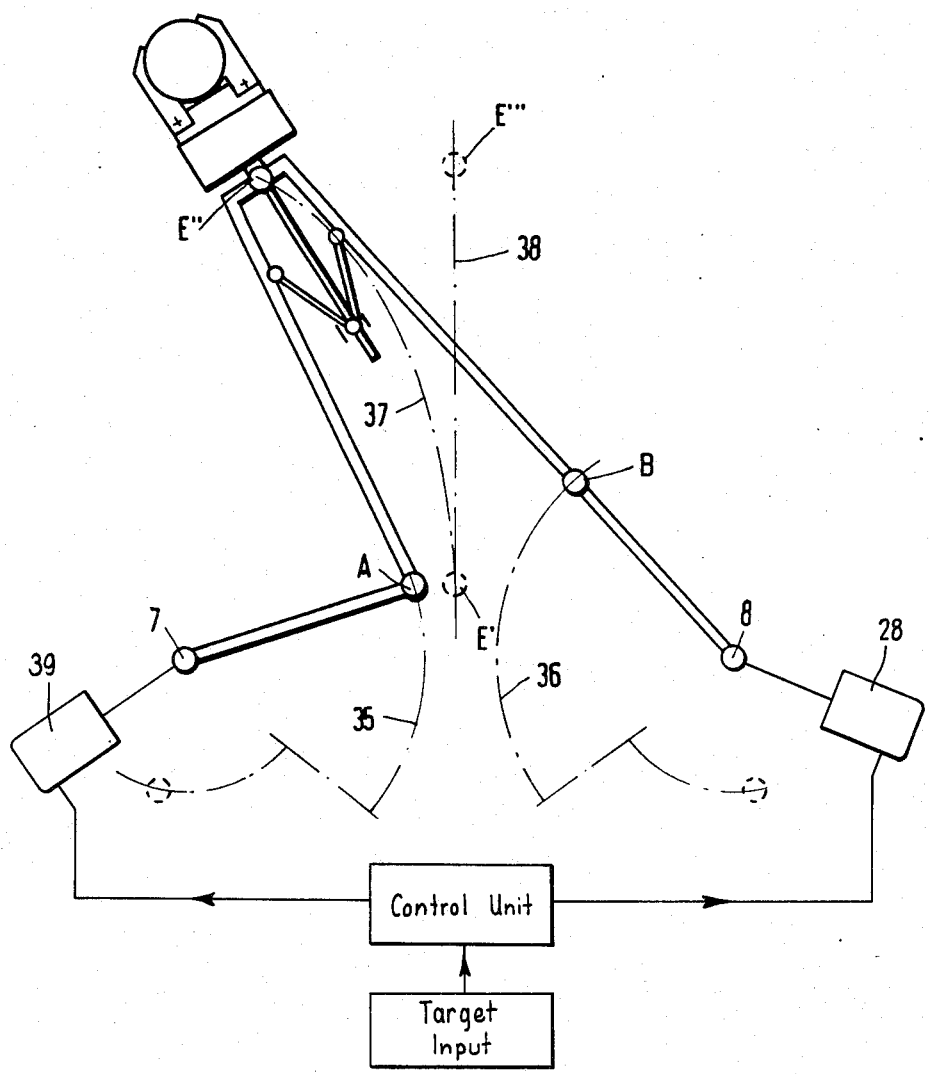

More often yet, however, is the necessity to be able to move not only to one end position but to several various end positions,, independent of the possible swivel movement 24 of the base plate 1. For such cases, operative connection to the chains 31 and 32 is omitted and the axis 7 has a separate drive member 39. Through suitable control mechanisms, it is possible to choose and superpose with one another the start, duration and end of the rotational movements so that any desired end positions within reach of the swivel and hinged arms can be reached. On example is illustrated in FIG. 7 wherein the position of the joint E is again identified by E' in the initial position and by E" in the illustrated end position. Of course, it is possible to move also to other points on or next to the curved sector 37, among others also all points between E' and E'" on the straight line 38.

The swivel and hinged arms, just like the joint head and the sliding joint parallelogram, are only schematically illustrated in FIGS. 6 and 7. The arcs 35 and 36, which the joints A and B describe, are for space reasons partly illustrated in a reduced scale.

FIG. 8 illustrates the design of the swivel and hinged arms 6 and 14 and of the joints B, D and G (the arms 5 and 13 and the joints A, C and F are designed alike). The swivel arm 6 is formed by two flat pieces 40 and 41 with a box-shaped carrier 42 therebetween. In the two low friction bearings 43 and 44 in the overhanging ends of the flat pieces 40 and 41 there is rotatably supported an axle 45. The axle 45 forms with the bearings 43 and 44 the joint B. The axle 45 is fixed to and against relative rotation to a double-T-carrier 46 defining the hinged arm 14. At the other end of the double-T-carrier, there is rotatably supported an axle 47 in two low friction bearings 48 and 49. The axle 47 is fixed to and against relative rotation to the joint head 15. The axle 47 forms together with the bearings 48 and 49 the joint D. In the double-T-carrier 46 is also mounted the steering knuckle arm 20 by a bolt 50 in bushings 51 and 52 (joint G). In place of the bushings low friction bearings can be provided. The bearings 44 and 49 are held in place by holding rings 53 and 54 secured to the side wall of the flat piece 41 and the double-T-carrier 46, respectfully. The rotationally fixed connection between the bolts 45, 47 and 50 and the double-T-carrier 46, the joint head 15 and the steering knuckle arm 20 is accomplished by utilizing conventional, not illustrated means, for example keyes, set screws or the like. The double, symmetrical support of all parts assures a stiff, bend-free connection between the hingedly connected parts.

The handling mechanism according to the invention need not correspond in all details with the described exemplary embodiment. Other modifications fall within the scope of the invention.

The embodiments of the invention in which an exclusive property or privilege is claimed are defined as follows:

1. A mechanical handling mechanism comprising at least one gripping mechanism or the like, which is movable back and forth between an initial and an end position, comprising:
   (a) two swivel arms rotationally drivably supported about axes which are parallel to one another on a base plate;
   (b) a hinged arm is hinged to each free end of the swivel arms;
   (c) the free ends of the hinged arms are hinged to a common joint head, which carries at least a gripping mechanism thereon;
   (d) a steering knuckle arm hinged to each of the hinged arms such that the steering knuckle arms form a sliding joint parallelogram with the hinged arms, the slide member of which parallelogram is guided on the joint head; and
   (e) the axes of all joints lie parallel with respect to the axes of rotation of the swivel arms.

2. The mechanical handling mechanism according to claim 1, wherein the two hinged arms are hinged to the joint head through a common joint.

3. The mechanical handling mechanism according to claim 1, wherein the two swivel arms and the two hinged arms are of equal length and one is the mirror image of the other in the initial position.

4. The mechanical handling mechanism according to claim 1, wherein a drive member is provided only on one of the two swivel arms and same is drivingly connected with the other swivel arm.

5. The mechanical handling mechanism according to claim 4, wherein the driving connection consists of two crossing chains of finite length which are arranged in various planes.

6. The mechanical handling mechanism according to claim 1, wherein for the swivel drive each of the two swivel arms has a separate servomotor and the two servomotors are turned on and off by a control mechanism of the hand mechanism.

7. The mechanical handling mechanism according to claim 1, wherein at least the gripping mechanism is rotatable about an axis which extends in its direction of movement.

8. The mechanical handling mechanism according to claim 1, wherein the base plate is elevationally adjustable.

9. The mechanical handling mechanism according to claim 1, wherein the base plate is rotatable about an axis which is parallel with respect to the axes of rotation of the swivel arms.

10. The mechanical handling mechanism according to claim 1, wherein the swivel arms and/or the hinged arms and/or the joint head have at least in the region of the joints profile sections which are open laterally in cross section, and wherein the joints are formed by axles which are each doubly supported within the profile sections, said axles being hinged to the other part between their bearings.

* * * * *